United States Patent [19]

Guarneri et al.

[11] Patent Number: 4,999,471

[45] Date of Patent: Mar. 12, 1991

[54] METHOD FOR HEAT PREPACKAGED FOOD PRODUCTS USING MICROWAVES IN A HEATED SUPERATMOSPHERIC CHAMBER

[75] Inventors: Roberto Guarneri, Parma; Claudio Ferrari, Reggio Emilia, both of Italy

[73] Assignee: Barilla G.E.R. F.LLI · Societa per Azioni, Parma, Italy

[21] Appl. No.: 361,476

[22] Filed: Jun. 5, 1989

[30] Foreign Application Priority Data

Jun. 3, 1988 [IT] Italy ............................ 20853 A/88

[51] Int. Cl.⁵ ................................................ H05B 6/64
[52] U.S. Cl. ..................... 219/10.55 M; 219/10.55 A; 219/10.55 E; 99/451; 422/21; 426/521
[58] Field of Search ................. 219/10.55 A, 10.55 R, 219/10.55 E, 10.55 M, 388, 400; 99/451, DIG. 14, 470, 443 C; 426/521, 524, 523, 241, 234; 422/21

[56] References Cited

U.S. PATENT DOCUMENTS

| | | | |
|---|---|---|---|
| 3,335,253 | 8/1967 | Jeppson et al. | 219/10.55 A |
| 3,570,391 | 3/1971 | Rejler | 219/10.55 A |
| 3,718,082 | 2/1973 | Lipoma | 219/10.55 A |
| 3,961,569 | 6/1976 | Kenyon et al. | 99/451 |
| 4,479,776 | 10/1984 | Smith | 99/443 C |
| 4,543,263 | 9/1985 | Goldhahn | 99/470 X |

*Primary Examiner*—Philip H. Leung
*Attorney, Agent, or Firm*—Sughrue, Mion, Zinn, Macpeak & Seas

[57] ABSTRACT

In order to stabilize pre-packaged food products and simultanously sanitize the packages, the packages are treated with microwaves in a first processing zone in an atmosphere where hot air is maintained at a superatmospheric pressure. The hot hair is thermostat-regulated at a temperature slightly above that which has been set for stabilizing the food products. The packages are then transferred to a second processing zone maintained at the temperature and pressure of the first zone but free of microwaves. The packages are then transferred to a cooling zone for cooling at a predetermined cooling temperature at superatmospheric pressure. The hot and cold air in the heating and cooling zones are kept in constant motion.

6 Claims, 1 Drawing Sheet

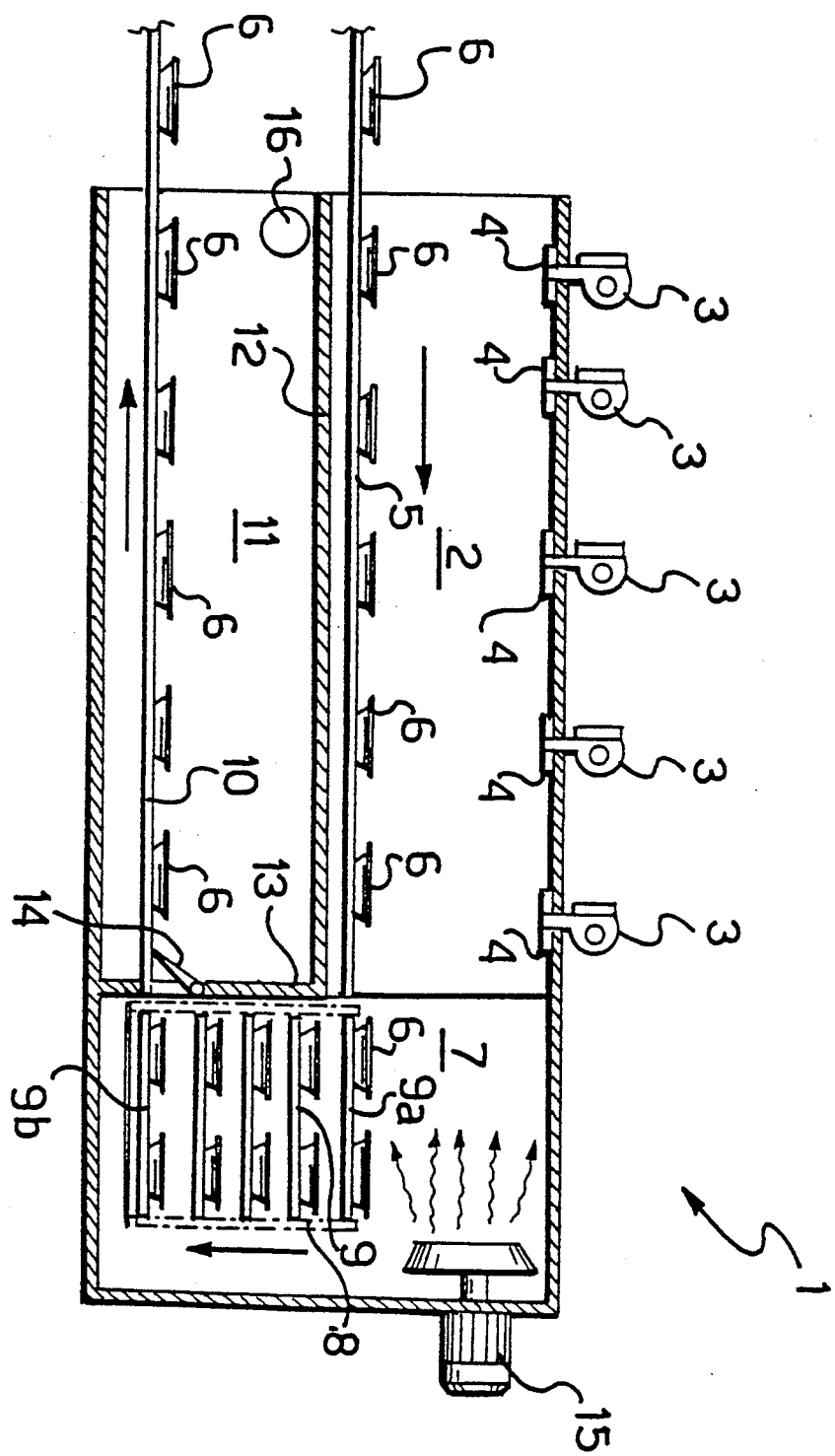

METHOD FOR HEAT PREPACKAGED FOOD PRODUCTS USING MICROWAVES IN A HEATED SUPERATMOSPHERIC CHAMBER

BACKGROUND OF THE INVENTION

This invention relates to a method for heat stabilizing pre-packaged food products on a continuous basis.

More particularly, this invention is concerned with a continuous stabilization method for stabilizing, by exposure to microwaves, food products which have been packaged and sealed in containers at least partly transparent to microwaves.

In order to impart good preservability and prolonged shelf life to generic food products, and specifically to stuffed and unstuffed pasta products, the enzymes present in such products require to be deactivated, and the growth of microorganisms must be inhibited as by drastically reducing their content or even killing all of the microorganisms present therein.

A suitable heat treatment of the food products, as carried out at temperature levels and for time periods to be selected in accordance with the results sought, such as at 80° C. for pasteurization and 120° to 130° C. for sterilization, is the most commonly used of conventional practices, and in many cases, is still the most reliable one for the purpose just outlined.

However, this prior technique has had since its inception a serious drawback tied to the very time/temperature parameters, which are known to affect significantly the organoleptic and nutritional properties of food products subjected to heat treatment.

This drawback is aggravated by the food products being packaged and sealed within containers where, to ensure that their parts at the container middle can attain a predetermined processing temperature, the peripheral parts, i.e. those closest to the container walls, are likely to exceed said temperature and remain under such a critical condition for a time period which may be significantly long.

Organoleptic and nutritional deterioration of the peripheral parts is the unavoidable consequence of the above.

A factual technical contribution toward obviating the above-noted drawback has come from the use of electromagnetic energy (microwaves), which enables food products to be heated at a very fast rate even to relatively high temperature levels, such as those required for sterilization, in the range of about 120° to 130° C.

The ability to shorten significantly the residence time of food products under high temperature conditions has been in many cases resolutive from the standpoint of safeguarding their organoleptic properties.

Resorting to microwaves also has, however, drawbacks which are not easily overcome or overcome at all and originate basically from an uneven application of heat to the product which is dependent, in turn and for a given time of exposure to the microwaves, on the very nature of microwaves, the temperature increase sought (the larger the temperature increase the more uneven the product heating), the chemical and physical characteristics of the product (e.g., the higher the moisture content the less uniform the heating), the geometrical characteristics of the product, taking into account its density and the progressive loss of energy undergone by the impinging microwaves.

Further aspects of the technical problem involved in the microwave processing of food products sealed within containers which are transparent to microwaves are the need to sanitize (e.g. by pasteurization or sterilization) the containers and prevent them from distorting or possibly cracking (bursting) due to increased internal pressure.

For the latter aspects, it has been suggested of carrying out the heat treatment by microwave application in an environment maintained at a superatmospheric (2–3 atmospheres) steam pressure.

While this teaching is successful to prevent the containers of products being processed from cracking or becoming damaged, it has, nevertheless, the important disadvantage that the outermost layers of the product are further overheated which, due to the action by the microwaves, are already at a higher temperature than the innermost ones.

Moreover, steam could condense over the container surfaces, thereby the impinging microwaves are substantially attenuated and the uneven heating of the product being processed is made worse which was bad already. Condensation problems may also be encountered at the process start over the cold parts of the equipment used to apply the heat treatment, which reflects in the unevenness of heating being further aggravated due to unforeseable substractions of useful heat from the product to have the condensation water vaporized.

The problem underlying this invention is to provide a method for heat stabilizing, on a continuous and commerical scale basis, pre-packaged food products by the use of microwaves, and having such operational features as to fully overcome the above-noted drawbacks affecting the prior art.

SUMMARY OF THE INVENTION

This problem is solved, according to the invention, by a method for heat stabilizing food products pre-packaged in containers which are at least partly transparent to microwaves, while at the same time sanitizing said containers, being characterized in that it comprises the steps of heating, as by the application of microwaves, said pre-packaged food products to a predetermined heating temperature in a first processing zone where a hot air atmosphere is maintained at a superatmospheric pressure, said air being thermostat-regulated at a temperature substantially equal to the predetermined heating temperature, keeping the food products, for a predetermined time period and under a substantially adiabatic condition, at the attained heating temperature in a second processing zone where a hot air atmosphere is maintained at a superatmospheric pressure, and cooling said food products in a cooling zone.

Advantageously, the food products pre-packaged in said containers are moved through said processing and cooling zones continuously at a speed which is selected according to the residence times set to attain the predetermined heating and cooling temperatures, respectively.

Further, cooling is preferably effected using cool air at a superatmospheric pressure.

In accordance with a further aspect of this invention, through said heating and cooling zones, the hot, respectively cool, air is kept moving.

The cooling temperature is selected to have the internal pressure of said cooled containers at a level which does not result in the containers undergoing distortion.

Advantageously in accordance with another aspect of this invention, the hot air in at least said second processing zone is thermostat-regulated at a temperature above the predetermined heating temperature by 2° C.

In principle, the heating temperature and the residence time of the product during the heating step are set by microbiological considerations tied to the microorganisms and enzymes to be rendered inactive. As an example, where yeasts and mildews are to be blocked for certain food products, it will be sufficient to maintain such products at a temperature of about 80° C. for approximately 5 minutes.

The value selected for the predetermined hot and cool air pressures in the processing and cooling zones, respectively, is to accommodate both the expansion of the gases inside the containers wherein the products are packaged, and the pressure of the steam also generated inside said containers from vaporization of the product moisture.

The residence time, during which the heated food product is kept under a substantially adiabatic condition, is a compromised time between the need to sanitize the container and not to affect the organoleptic characteristics of the product. Illustratively, an average residence time of about 5 minutes is acceptable in most cases.

Accordingly, the inventive method will proceed through the steps described in detail herein below.

In a first step, the food product is heated by exposure to the microwaves, at the fastest possible rate to bring it up to a predetermined temperature which may be a pasteurization or sterilization temperature. During this step, the hot air under pressure materially contributes heat to the container, after heating the otherwise cool surfaces of the enclosure which defines the processing zone. This is an important factor especially from the standpoint of uniformity of the product heating by microwaves. In fact, the uneven heating that is typical of microwaves is at least no further aggravated by heat radiation from the packaged products toward the enclosure in which they are being treated with microwaves.

In a second step, the heated products are kept for a given time period at a desired temperature under a substantially adiabatic condition, that is a condition preventing any exchange of heat between the packaged product and the environment. It is during this step that the container and the film which usually seals off the product in the container are fully sanitized. Also promoted is the transfer of heat by conduction to the product interior, thereby attenuating the uneven heating provided by the microwaves.

Lastly, in a third step, the product is cooled while packaged in its respective container.

It is important to observe that in the method of this invention the microwaves are only utilized to bring the product up to a predetermined desired temperature and not to stabilize it.

BRIEF DESCRIPTION OF THE DRAWINGS

Further features and the advantages of the invention will be more clearly understood from the following description of illustrative embodiments thereof, to be read by way of example and not of limitation in conjunction with the apparatus shown schematically in the accompanying drawing which is a schematic sectional view of the apparatus.

DETAILED DESCRIPTION OF THE INVENTION

For the purpose of continuously stabilizing pre-packaged food products thermally, in accordance with this invention, an apparatus is used which is generally indicated at 1 and comprises a first processing zone or chamber 2 along which there are laid, in an appropriate arrangement, a plurality of magnetrons 3 the antennas 4 of which are oriented in a direction toward a conveyor 5 supported in and driven through said processing chamber 2 to continuously move a plurality of packages 6 therethrough which are at least partly transparent to microwaves, such as trays, bags, and the like, and seal off metered amount of the food product to be treated.

A second processing zone or chamber 7 having no magnetrons is suitably screened from the microwaves generated by the magnetrons 3 of the processing chamber 2.

Placed in the second chamber 7 is a buffer magazine 8 having shelves 9 which are movable in a vertical direction.

The top shelf 9a of said magazine is aligned to the conveyor 5 in the chamber 2 to receive food product packages 6 therefrom.

The bottom shelf 9b of the magazine 8 is aligned to a conveyor 10, which is supported in and driven through a cooling zone or chamber 11 defined in the apparatus 1 at a location underlying the first processing zone 2, from which it is separated by a thermally insulating wall 12 screening it from microwaves.

A transfer means, not shown because quite conventional and foreign to this invention, is arranged to transfer the packages 6 from the conveyor 5 onto the first top shelf 9a of the magazine 8, and from the bottom shelf 9b of the magazine 8 to the conveyor 10. The last-mentioned transfer movement takes place through a door 14 which is provided at the bottom of a partition wall 13 insulating the cooling chamber 11 thermally from the second processing chamber 7.

Inside the processing chambers 2 and 7, hot air is maintained at a superatmospheric pressure which is advantageously circulated by a fan 15, for example. Inside the cooling chamber 11, there is cool air at a superatmospheric pressure which is advantageously circulated by means of a fan 16, for example. Air heating and cooling devices, respectively, within the chambers 2-7 and 11, and their respective thermostat means for regulating them at the preset temperatures, are not shown because quite conventional.

With reference to the apparatus generally discussed herein above, some Examples of continuous food product heat stabilization will be given next.

EXAMPLE 1

Inside the processing chambers 2 and 7 of the apparatus 1, hot air is thermostat-regulated at a temperature of 87°-88° C., set into motion by the fan 15, and maintained at a pressure of 2.5 atmospheres.

Inside the cooling chamber 11, the air is thermostat-regulated at 30° C., while still at a pressure of about 1 atmosphere, and set into motion by its respective fan 16.

On sensing, via a number of suitably located thermal probes, that inside the processing chambers 2 and 7 the set temperature of 87°-88° C. was uniformly distributed, the magnetrons 3 are operated while at the same time the feeding onto the moving conveyor 5 of packages 6 is begun on a continuous basis which carried 250 g "tortellini" stuffed with meat sealed therein. The speed of advance of the conveyor 5 is selected such that the residence time of the individual packages 6 in the processing chamber 2 was eight minutes. At this time setting, the "tortellini" are heated by the action of the microwaves from a starting temperature of 20° C. to a predetermined temperature of 85° C. During this "tortellini" heating step by microwaves, the pressurized hot air effectively assisted the package heating and the maintenance of uniformly distributed heat throughout the chamber 2.

In the successive processing chamber 7, thermostat regulated at 87°–88° C., the "tortellini" in the individual packages are maintained for a time period of five minutes at the attained heating temperature of 85° C., while the individual packages are transferred into the cooling chamber 11.

During the stay in the chamber 7, wherein the "tortellini" are under a substantially adiabatic condition (temperature of the "tortellini", 85° C.; temperature of the pressurized hot air, 87° C.), there occurred the desired stabilization of the products and completion of the package sanitization, as started in the preceding chamber 2.

In the cooling chamber 11 the individual packages, while still subjected to a pressure of about 1 atmosphere, are brought gradually to a final temperature of 60° C. To attain this temperature, the required residence time inside the cooling chamber was 8 minutes.

Bacteriological tests carried out on the "tortellini" at the inlet to the first processing chamber 2 and the outlet from the second processing chamber 7 show an overall bacterial charge of $10^4$ and $10^2$, respectively.

EXAMPLE 2

Inside processing chambers 2 and 7 of the apparatus 1, hot air is thermostat-regulated at a temperature of 123°–124° C., set into motion by the fan 15, and maintained at a pressure of 3 atmospheres.

Inside the cooling chamber 11, the air, again at a pressure of 3 atmospheres, is thermostat-regulated at 20° C. and set into motion by its respective fan 16.

On sensing, as by means of a number of suitable thermal probes, that within the processing chambers 2 and 7 the set temperature of 123°–124° C. is uniformly distributed, the magnetrons 3 are operated and at the same time feeding is begun continuously onto the moving conveyor 5 of packages 6, each having 500 g baked pasta product sealed therein. The speed of advance of the conveyor 5 had been selected such that the residence time of the individual packages 6 in the processing chamber 2 was 15 minutes. With this residence time, the baked pasta product is heated by exposure to the microwaves from a starting temperature of 20° C. to a set temperature of 121° C.

During this step of fast heating of the baked pasta product by means of the microwaves, the pressurized hot air effectively contributed to the package heating and the maintenance of uniformly distributed heat throughout the chamber 2.

In the successive processing chamber 7, as thermostat-regulated at 123°–124° C., the baked pasta product in the individual packages is kept for five minutes at the temperature of 121° C. attained in the course of the previous heating, and the individual packages are taken to the cooling chamber 11. During the stay in the chamber 7, wherein the baked pasta product was substantially under an adiabatic condition (temperature of the baked pasta product, 121° C.; temperature of the pressurized hot air, 123° C.), the desired stabilization of the baked pasta product takes place along with completion of the respective package sanitization as already commenced in the chamber 2.

Inside the cooling chamber 11, the individual packages, while still subjected to a pressure of 2.5 atmospheres, are gradually brought to a final temperature of 60° C. For this purpose, the necessary residence time within the cooling chamber 11 is 15 minutes.

Bacteriological tests carried out on the baked pasta product at the inlet to the first processing chamber 2 and the outlet from the second processing chamber 7 shows an overall bacterial charge of $10^4$ and $10^2$, respectively.

We claim:

1. A method of heat stabilizing food products pre-packaged in containers which are at least partly transparent to microwaves, while at the same time sanitizing said containers, characterized in that it comprises the steps of heating, as by the application of microwaves, said pre-packaged food products to a predetermined heating temperature in a processing zone where a hot air atmosphere is maintained at a superatmospheric pressure, said air being thermostat-regulated at a temperature substantially equal to the predetermined heating temperature, keeping the food products, for a predetermined time period and under a substantially adiabatic condition, at the attained heating temperature in a second processing zone where a hot air atmosphere is maintained at a superatmospheric pressure, and cooling said food products at a cooling temperature in a cooling zone at a superatmospheric pressure.

2. A method according to claim 1, characterized in that said containers are moved continuously through the processing and cooling zones at a speed set according to the residence times selected to attain said heating and cooling temperatures, respectively.

3. A method according to claim 1, characterized in that said cooling step is carried out by means of cool air at a superatmospheric pressure.

4. A method according to claim 1, characterized in that said heating and cooling zones include hot air and cool air, respectively, kept in constant motion.

5. A method according to claim 1, characterized in that the cooling temperature is selected such that the internal pressure of said cooled containers is at levels unlikely to introduce distortion of the containers.

6. A method according to claim 1, characterized in that the hot air in at least said second processing zone is thermostat-regulated at a temperature 2° C. higher than the predetermined heating temperature.

* * * * *